US012000777B2

(12) United States Patent
Jang et al.

(10) Patent No.: US 12,000,777 B2
(45) Date of Patent: Jun. 4, 2024

(54) VOLUME CHANGEABLE POLYMER HUMIDITY SENSOR

(71) Applicant: POSTECH Research and Business Development Foundation, Pohang-si (KR)

(72) Inventors: Jaehyuck Jang, Goyang-si (KR); Junsuk Rho, Pohang-si (KR)

(73) Assignee: POSTECH RESEARCH AND BUSINESS DEVELOPMENT FOUNDATION, Gyeongsangbuk-Do (KR)

( * ) Notice: Subject to any disclaimer, the term of this patent is extended or adjusted under 35 U.S.C. 154(b) by 662 days.

(21) Appl. No.: 17/181,845

(22) Filed: Feb. 22, 2021

(65) Prior Publication Data

US 2021/0396659 A1 Dec. 23, 2021

(30) Foreign Application Priority Data

Jun. 17, 2020 (KR) .................. 10-2020-0073805
Dec. 29, 2020 (KR) .................. 10-2020-0186395

(51) Int. Cl.
*G01N 21/3554* (2014.01)
*G01B 11/06* (2006.01)
*G01N 21/81* (2006.01)

(52) U.S. Cl.
CPC ......... *G01N 21/3554* (2013.01); *G01B 11/06* (2013.01); *G01N 21/81* (2013.01)

(58) Field of Classification Search
CPC ....... G01N 21/3554; G01N 2021/7789; G01N 2021/7723; G01B 11/06; G01B 11/0625; G01B 11/16; G01B 17/04; B63B 79/10

(Continued)

(56) References Cited

U.S. PATENT DOCUMENTS

2007/0017276 A1* 1/2007 Trutna, Jr. ........... G01N 27/223
                                                     73/29.01
2010/0209698 A1* 8/2010 Kornherr ............... D21H 19/82
                                                     428/323

(Continued)

FOREIGN PATENT DOCUMENTS

JP       2000105216       4/2000
JP       2004296458       10/2004

(Continued)

OTHER PUBLICATIONS

Translation KR-20210096897 (Year: 2021).*

(Continued)

*Primary Examiner* — Peter J Macchiarolo
*Assistant Examiner* — Monica S Young
(74) *Attorney, Agent, or Firm* — CANTOR COLBURN LLP

(57) ABSTRACT

Disclosed are a sensor including a first metal layer and a second metal layer facing each other, and a volume changeable layer disposed between the first metal layer and the second metal layer and capable of absorbing a material to change the thickness thereof, wherein at least one of the first metal layer and the second metal layer is a semi-transmissive layer and the sensor indicates a color change by changing a resonance wavelength of light transmitted through the semi-transmissive layer according to a change in thickness of the volume changeable layer, and a sensor device, an electronic device, a smart window, and an IoT system including the same.

21 Claims, 23 Drawing Sheets

(58) Field of Classification Search
USPC .............................................. 73/862.381, 73
See application file for complete search history.

(56) References Cited

U.S. PATENT DOCUMENTS

| | | | | |
|---|---|---|---|---|
| 2010/0264333 | A1* | 10/2010 | Offermans | B82Y 30/00 977/774 |
| 2012/0183452 | A1* | 7/2012 | Schalkhammer | G01N 21/78 977/773 |
| 2014/0154808 | A1* | 6/2014 | Patel | A61L 2/28 436/1 |
| 2020/0008299 | A1* | 1/2020 | Tran | H05K 1/0386 |
| 2021/0396659 | A1* | 12/2021 | Jang | G01N 21/81 |

FOREIGN PATENT DOCUMENTS

| | | | | |
|---|---|---|---|---|
| JP | 2008002943 | | 1/2008 | |
| JP | 5917512 | | 5/2016 | |
| JP | 2017227499 | | 12/2017 | |
| KR | 1020130059431 | | 6/2013 | |
| KR | 20130126132 | A * | 11/2013 | |
| KR | 1020130126132 | | 11/2013 | |
| KR | 1020140031314 | | 3/2014 | |
| KR | 1020170077349 | | 7/2017 | |
| KR | 20210096897 | A * | 8/2021 | |
| WO | WO-2012172971 | A1 * | 12/2012 | ............ G01N 21/47 |
| WO | WO-2017099532 | A1 * | 6/2017 | ............ C08F 212/12 |
| WO | 2018230736 | | 12/2018 | |

OTHER PUBLICATIONS

Chunghwan Jung, et al., "Disordered-nanoparticle-based etalon for ultrafast humidity-responsive colorimetric sensors andanti-counterfeiting displays", Science Advances, vol. 8, (2022) Mar. 11, 2022, (8 pages).

Anton Buchberger, et al., "Fast Optical Humidity Sensor Based on Hydrogel Thin Film Expansion for Harsh Environment", Sensors (Basel), (Mar. 2019), vol. 19 No. 5, p. 1-13.

Ayah F.S. Abu-Hani, et al., "Low-temperature and fast response H2S gas sensor usingsemiconducting chitosan film", Sensors and Actuators B, vol. 253, (2017), 677-684.

Hyunsoo Kwon, et al., "Chemically Tunable, Biocompatible, and Cost-Effective Metal—Insulator—Metal Resonators Using Silk Protein and Ultrathin Silver Films", ACS Photonics, (2015), vol. 2, p. 1675-1680.

Indu Gupta, et al., "Synthesis and characterization of poly(AAmco-BMA-co-AAc) hydrogels: effect of acrylamide content on swelling behaviour", Designed Monomers and Polymers, (2006), vol. 9, No. 6, pp. 589-605.

Jaehyuck Jang, et al., "Self-Powered Humidity Sensor Using Chitosan-Based Plasmonic Metal—Hydrogel—Metal Filters", Adv. Optical Mater., (2020), p. 1-7.

Liang Hu, et al., "Color modulation of spatially isolated regions on a single poly(Nisopropylacrylamide) microgel based etalon", J. Mater. Chem., (2012), vol. 22, p. 8199-8202.

Maria C. Chiappelli, et al., "Photonic Multilayer Sensors from Photo-Crosslinkable Polymer Films", Advanced Materials, (2012), vol. vol. 24, p. 6100-6104.

Md. Rajibul Islam, et al., "Chronology of Fabry-Perot Interferometer Fiber-Optic Sensors and Their Applications: A Review", Sensors, (2014), vol. 14, p. 7451-7488.

Meng Qin, et al., "Bioinspired Hydrogel Interferometer for Adaptive Coloration and Chemical Sensing", Advanced Materials, (2018), vol. 30, p. 1-7.

* cited by examiner

2000

VOLUME CHANGEABLE POLYMER HUMIDITY SENSOR

CROSS-REFERENCE TO RELATED APPLICATION

This application claims priority to and the benefit of Korean Patent Application No. 10-2020-0073805 filed in the Korean Intellectual Property Office on Jun. 17, 2020, and Korean Patent Application No. 10-2020-0186395 filed in the Korean Intellectual Property Office on Dec. 29, 2020, the entire contents of which are incorporated herein by reference.

BACKGROUND

1. Field

A sensor and a sensor device are disclosed.

2. Description of the Related Art

Structural color is a color that appears due to optical phenomena such as diffraction or interference caused by an interaction of light with the structure. Various devices using such structural colors have been proposed, but since the color expressed by the dimension or shape of the structure is fixed, it is impossible to adjust the color of the device once manufactured.

SUMMARY

An embodiment provides a sensor capable of real-time detecting of a predetermined material or its content through color change.

Another embodiment provides a sensor device including the sensor.

Another embodiment provides an electronic device including the sensor or the sensor device.

Another embodiment provides a smart window including the sensor or the sensor device.

Another embodiment provides an IoT system including the sensor or the sensor device.

According to an embodiment, a sensor includes a first metal layer and a second metal layer facing each other, and a volume changeable layer disposed between the first metal layer and the second metal layer, the volume changeable layer being configured to absorb material to change the thickness thereof, wherein at least one of the first metal layer and the second metal layer is a semi-transmissive layer, and the sensor indicates a color change by changing a resonance wavelength of light transmitted through the semi-transmissive layer according to a change in thickness of the volume changeable layer.

The first metal layer and the second metal layer may be a first semi-transmissive layer and a second semi-transmissive layer, respectively, and the first semi-transmissive layer may be a light incident layer into which external light including a visible wavelength spectrum is incident, the second semi-transmissive layer may be a layer configured to transmit light of the resonance wavelength enhanced by repetitive reflection between the first semi-transmissive layer and the second semi-transmissive layer, and inner surfaces of the first semi-transmissive layer and the second semi-transmissive layer facing each other may have a mirror surface configured to reflect at least a portion of light of a visible wavelength spectrum.

The peak of the transmission spectrum of light transmitted through the second semi-transmissive layer may belong to a visible wavelength spectrum.

As the volume changeable layer expands, the peak of the transmission spectrum of the light transmitted through the second semi-transmissive layer may be shifted into a long wavelength spectrum.

The first semi-transmissive layer and the second semi-transmissive layer may each include a semi-transmissive metal layer having a thickness of about 2 nm to about 50 nm.

The first metal layer may be a porous semi-transmissive layer.

The porous semi-transmissive layer may include metal nanoparticles.

The volume changeable layer may be configured to expand by absorption of the material and contract by discharge or loss of the material.

The material may include moisture.

The thickness of the volume changeable layer may change in the range of about 50 nm to about 800 nm.

The volume changeable layer may include an insulating polymer network.

The insulating polymer network may include a hydrogel.

The volume changeable layer may include a moisture absorbing polymer, and the sensor may be a humidity sensor.

According to another embodiment, a sensor device includes the sensor and a photovoltaic cell configured to convert light transmitted through the sensor into an electrical signal.

The photovoltaic cell may include a light absorbing layer configured to absorb light of at least a portion of wavelength spectrum of about 400 nm to about 700 nm.

The absorption spectrum of the photovoltaic cell may at least partially overlap with a transmission spectrum of light transmitted through the sensor.

A wavelength spectrum in which an absorption rate change is greater than or equal to about 50% among the absorption spectrum of the photovoltaic cell may at least partially overlap with the transmission spectrum of the sensor.

As the thickness of the volume changeable layer increases, the absorption rate of the photovoltaic cell may decrease.

The sensor device may further include a measuring unit configured to measure an amount of light absorbed by the photovoltaic cell, and a control unit configured to quantify the amount of light measured by the measuring unit.

The sensor may be a humidity sensor, and the control unit may quantify the amount of light as a relative humidity.

The sensor device may be a self-powered device configured to obtain power from light transmitted through the sensor.

According to another embodiment, a display device including the sensor or the sensor device is provided.

According to another embodiment, a smart window including the sensor or the sensor device is provided.

According to another embodiment, an IoT system including the sensor or the sensor device is provided.

Through the color change, the sensor may easily detect a predetermined material or its content in real-time and operate by itself without an external power source.

DETAILED DESCRIPTION

Figure 1:
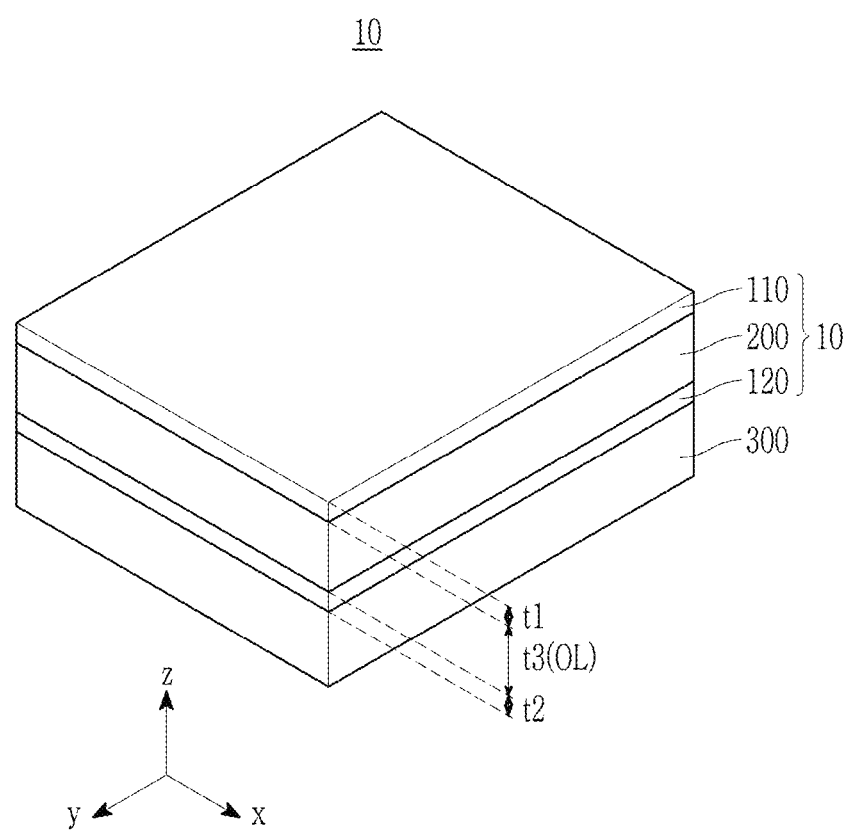
FIG. 1 is a schematic view showing an example of a sensor according to an embodiment.

Hereinafter, embodiments will be described in detail so that those of ordinary skill in the art can easily implement them. However, a structure that is actually applied may be implemented in various different forms, and is not limited to the embodiments described herein.

In the drawings, the thickness of layers, films, panels, regions, etc., are exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present.

In drawings, in order to describe the embodiments of the present invention explicitly, some elements are not depicted. Like reference numerals designate the same or similar elements throughout the specification.

Hereinafter, the terms "lower" and "upper" are used for better understanding and ease of description, but do not limit the position relationship.

Hereinafter, a sensor according to an embodiment is described with reference to the drawings.

Figure 2:
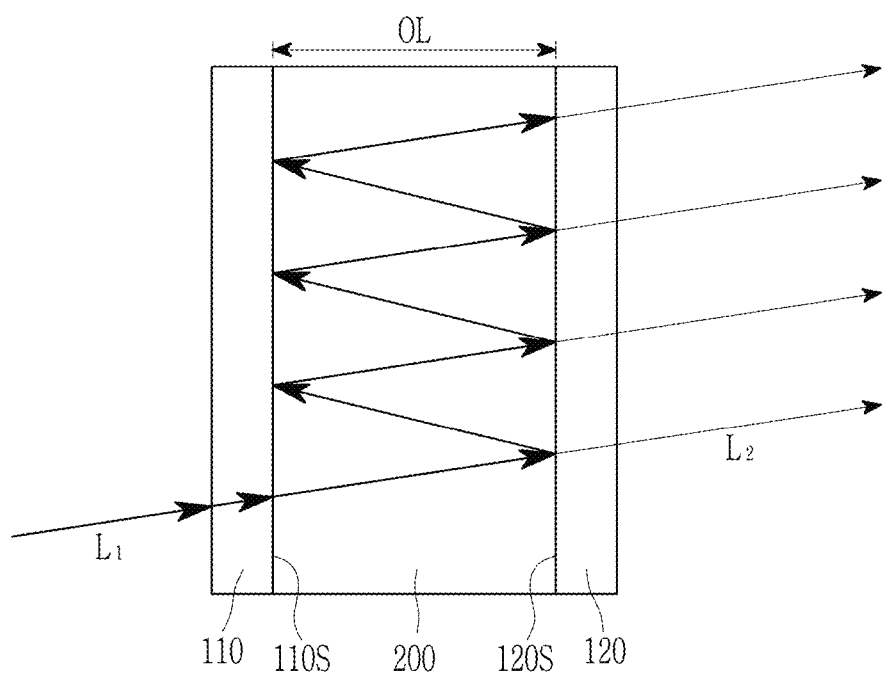
FIG. 2 is a schematic view showing a resonance principle of the sensor of FIG. 1, FIGS. 3A and 3B are schematic views showing thickness changes according to absorption of a material by the sensor of FIG. 1.
Figure 3A:
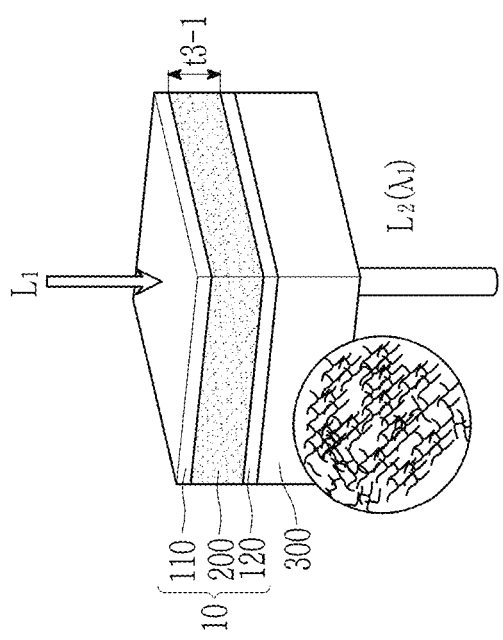
Figure 3B:
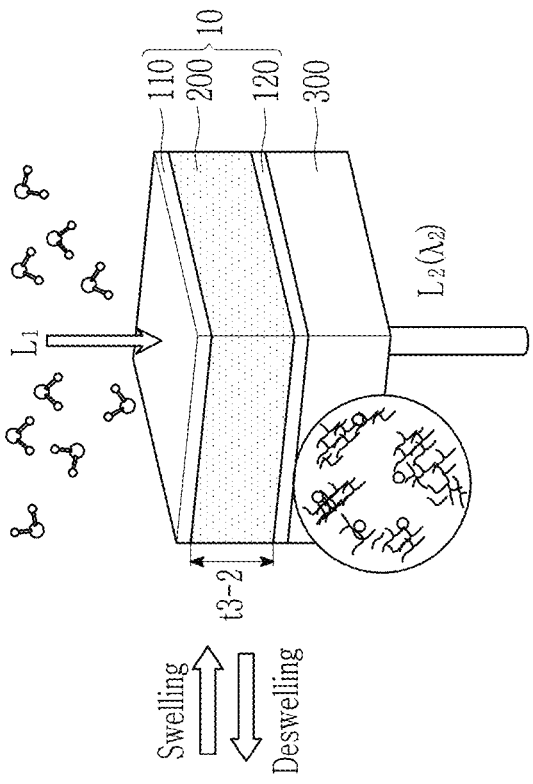

FIG. 1 is a schematic view showing an example of a sensor according to an embodiment, FIG. 2 is a schematic view showing a resonance principle of the sensor of FIG. 1, and FIGS. 3A and 3B are schematic views showing thickness changes according to absorption of a material by the sensor of FIG. 1.

The sensor according to an embodiment may be a chemical sensor configured to detect a predetermined material and its content or physical properties. The material detected by the sensor may be gas, liquid, and/or solid material. The sensor may be, for example, a humidity sensor configured to detect moisture in the air; a gas sensor configured to detect a chemical material; or a material property measurement sensor configured to evaluate the properties of a material such as temperature and pH, but is not limited thereto. As an example, the sensor may be a humidity sensor.

Referring to FIG. 1, a sensor 10 according to an embodiment includes a first metal layer 110 and a second metal layer 120 facing each other, and a volume changeable layer 200 disposed between the first metal layer 110 and the second metal layer 120.

The substrate 300 may be a support substrate supporting the sensor 10, and may be a transparent substrate. The substrate 300 may be made of an inorganic material such as glass; an organic material such as polycarbonate, polymethyl methacrylate, polyethylene terephthalate, polyethylene naphthalate, polyamide, polyethersulfone, or a combination thereof; a silicon wafer, or the like, but is not limited thereto. In the drawings, as an example, the substrate 300 is disposed under the second metal layer 120 is illustrated, but the present disclosure is not limited thereto and the substrate 300 may be disposed on the first metal layer 110. In some cases, the substrate 300 may be omitted.

At least one of the first metal layer 110 and the second metal layer 120 may be a semi-transmissive layer. Each of the semi-transmissive layers may be configured to transmit light of a predetermined wavelength spectrum and reflect light of a predetermined wavelength spectrum, and the average transmittance in the visible wavelength spectrum may be, for example, about 10% to about 70% or about 20% to about 60%.

For example, each of the first metal layer 110 and the second metal layer 120 may be a semi-transmissive layer. That is, the first metal layer 110 may be a first semi-transmissive layer, and the second metal layer 120 may be a second semi-transmissive layer.

When the first metal layer 110 and the second metal layer 120 are each semi-transmissive layer, the first metal layer 110 and the second metal layer 120 may each include a very thin metal layer having a thickness of several to tens of nanometers and may be, for example, made of silver (Ag), gold (Au), aluminum (Al), magnesium (Mg), an alloy thereof, or a combination thereof, but is not limited thereto. The thicknesses t1 and t2 of the first metal layer 110 and the second metal layer 120 may be, for example, about 2 nm to about 50 nm, and within the above range, about 5 nm to about 45 nm, about 10 nm to about 40 nm, about 15 nm to about 35 nm, about 20 nm to about 30 nm, or about 25 nm. When the thickness is within the above range, effective semi-transmission characteristics may be exhibited. Each of the first metal layer 110 and the second metal layer 120 may be one layer or two or more layers.

When the first metal layer 110 and the second metal layer 120 are each semi-transmissive layer, the first metal layer 110 may be a layer into which external light including a visible wavelength spectrum is incident, and the second metal layer 120 may be a layer through which light passing through the sensor 10 escapes. Here, the external light may be natural light or light irradiated by a light source. That is, light incident from the outside may be incident at one surface (the first metal layer 110) of the sensor 10 and may escape to the other surface (the second metal layer 120) of the sensor 10.

Referring to FIG. 2, the inner surfaces 110S and 120S facing each other of the first metal layer 110 and the second metal layer 120 may be mirror surfaces. The mirror surface may be configured to reflect light, for example, at least a portion of light in the visible wavelength spectrum.

The incident light $L_1$ through the first metal layer 110 may be configured to repeatedly reflected between the first metal layer 110 and the second metal layer 120 separated by a predetermined optical length OL to cause resonance. By such a resonance, light of a predetermined wavelength spectrum may be enhanced and light of other wavelength spectrum may be attenuated. Herein, the resonance may exhibit the same behavior as the Fabry-Perot resonance, and the wavelength at which resonance occurs (hereinafter referred to as "resonance wavelength") may be understood as a Fabry-Perot resonance wavelength. Light alone of a wavelength spectrum enhanced by the resonance, that is, light $L_2$ of a wavelength spectrum corresponding to the resonance wavelength, may pass through the second metal layer 120 and escape. That is, the incident light $L_1$ through the first metal layer 110 may be repeatedly reflected between the first metal layer 110 and the second metal layer 120 to be modified. Among the modified light, light having a wavelength spectrum corresponding to the resonance wavelength may be enhanced to escape through the second metal layer 120, and light having a wavelength spectrum other than the wavelength spectrum may be suppressed or disappeared. The transmission spectrum of the light passed through the second metal layer 120 may have wavelength selectivity in the visible wavelength spectrum and may have a peak belonging to the visible wavelength spectrum.

The resonance wavelength may be changed according to the aforementioned optical path length OL. For example, when the optical path length OL is increased, the resonance wavelength may be shifted into a longer wavelength spectrum, and when the optical path length OL is shortened, the resonance wavelength may be shifted into a shorter wavelength spectrum. The optical path length OL may be expressed as the gap between the first metal layer 110 and the second metal layer 120×a refractive index of the material forming the volume changeable layer 200, and may be proportional to the thickness t3 of the volume changeable layer 200.

The volume changeable layer 200 may be in contact with the first metal layer 110 and the second metal layer 120, respectively. The volume changeable layer 200 may change in volume (thickness) by absorbing a specific material. For example, the volume changeable layer 200 may expand by absorption of the specific material and contract by discharge or loss of a specific material. The specific material may be, for example, moisture (e.g., moisture in air) or a gas component, but is not limited thereto.

The volume changeable layer 200 may include a polymer configured to expand and/or contract by reversibly absorbing or discharging the specific material. The polymer may be, for example, a porous polymer, and may be, for example, a polymer network having a highly crosslinked three-dimensional structure. For example, the polymer may be an insulating polymer network. The volume changeable layer 200 may include, for example, a hydrophilic polymer, and may include, for example, a hydrogel configured to absorb moisture and expand. The hydrogel may include, for example, chitosan, collagen, carboxyethyl cellulose, gelatin, a derivative thereof, or a combination thereof, but is not limited thereto.

The volume changeable layer 200 may be configured to expand and increase in thickness due to the absorption of the specific material (e.g., moisture) of such a polymer, and the volume changeable layer 200 may be configured to contract and become thinner by the discharge or loss of the specific material (e.g., moisture). According to the thickness change of the volume changeable layer 200, a gap between the first metal layer 110 and the second metal layer 120, that is, the optical path length OL may be changed, and thus the resonance wavelength may be changed.

For example, when the volume changeable layer 200 includes a polymer configured to expand by absorbing moisture, the thickness of the volume change layer 200 may change according to humidity. For example, when the humidity is high, the volume changeable layer 200 may expand and become thick, and when the humidity is low, the volume changeable layer 200 may contract again. As the gap between the first metal layer 110 and the second metal layer 120, that is, the optical path length OL changes according to the humidity, the resonance wavelength varies, and accordingly, the color of the sensor 10 may change.

For example, as the thickness of the volume changeable layer 200 increases, the optical path length OL becomes longer, so that the resonance wavelength may be shifted into a long wavelength spectrum to relatively express the color of the long wavelength spectrum, while as the thickness of the volume changeable layer 200 decreases, the optical path length OL becomes shorter, so that the resonance wavelength may be shifted into a short wavelength spectrum to relatively express the color of the short wavelength spectrum. Accordingly, the color expressed by the sensor 10 may be changed according to the change in the thickness of the volume changeable layer 200, for example, the color may be changed in a clockwise or counterclockwise direction in a chromaticity diagram.

For example, the thickness of the volume changeable layer 200 may change in the range of about 50 nm to about 800 nm, within the range about 50 nm to about 500 nm, about 80 nm to about 500 nm, about 80 nm to about 400 nm, about 80 nm to about 350 nm, about 100 nm to about 500 nm, about 100 nm to about 400 nm, about 100 nm to about 350 nm, or about 100 nm to about 250 nm. The thickness after expansion of the volume changeable layer 200 may be thickened in a range of about 1% to about 300% compared with the initial thickness (before expansion of the volume changeable layer 200), and within this range, for example, may be thickened in a range of about 5% to about 200% or about 10% to about 100%. For example, the initial thickness t3 of the volume changeable layer 200 may be determined according to a refractive index of the volume changeable layer 200 and an absorption spectrum of the photovoltaic cell 20 to be described later, and may be, for example, about 50 nm to about 500 nm, within the above range, about 80 nm to about 450 nm, about 100 nm to about 400 nm, about 100 nm to about 300 nm, or about 100 nm to about 250 nm. The initial thickness t3 of the volume changeable layer 200 may be based on, for example, 25° C. and 20% relative humidity as a reference.

Referring to FIG. 3A, when the sensor 10 includes a volume changeable layer 200 having a first thickness (t3-1) between the first metal layer 110 and the second metal layer 120, the incident light $L_1$ entered through the first metal layer 110 may be modified by resonance between the first metal layer 110 and the second metal layer 120 to express a first color corresponding to the first wavelength (Ai) which is corresponded to the resonance wavelength through the second metal layer 120.

Referring to FIG. 3B, as the volume changeable layer 200 absorbs a material such as moisture (water molecule) and expands, the thickness of the volume changeable layer 200 may be changed to a second thickness (t3-2) which is thicker than the first thickness (t3-1), and the optical path length OL between the first metal layer 110 and the second metal layer 120 is extended to express a second color corresponding to the second wavelength ($\lambda_2$) which is shifted into a longer wavelength spectrum than the first wavelength ($\lambda_1$) through the second metal layer 120. On the other hand, when the volume changeable layer 200 is contracted by discharging or losing the material such as moisture to decrease the thickness, it may express the first color corresponding to the first wavelength ($\lambda_1$) such as in (a) of FIG. 3A.

The expansion/contraction may occur in a real time according to the surrounding environment, thereby the sensor 10 may effectively detect an amount or a property of a material in a real time through a color change. For example, when the material is moisture, the sensor 10 may instinctively detect real time humidity through a color change.

Hereinafter, a sensor according to another example is described.

Figure 4:
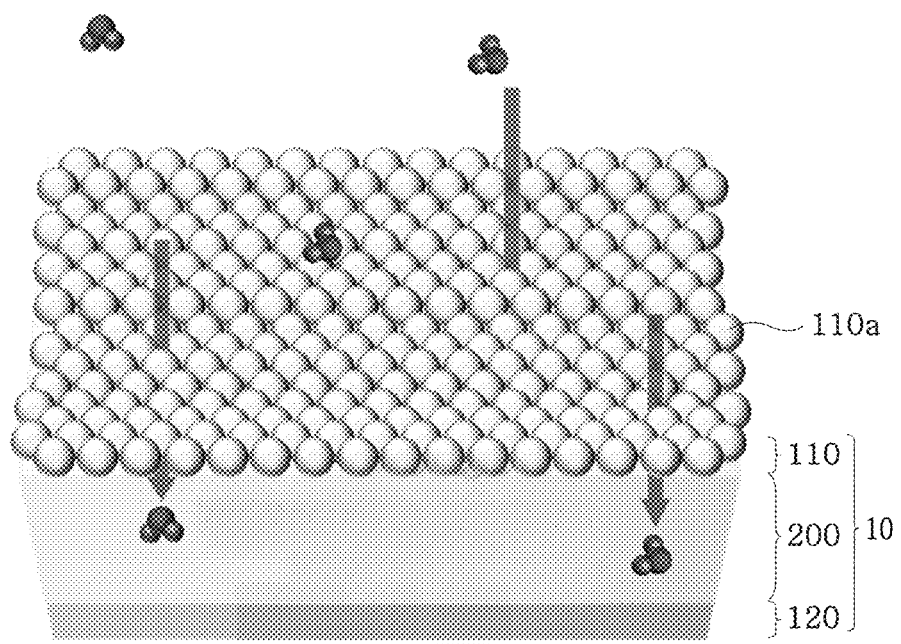
FIG. 4 is a schematic view showing another example of a sensor according to an embodiment.
Figure 5:
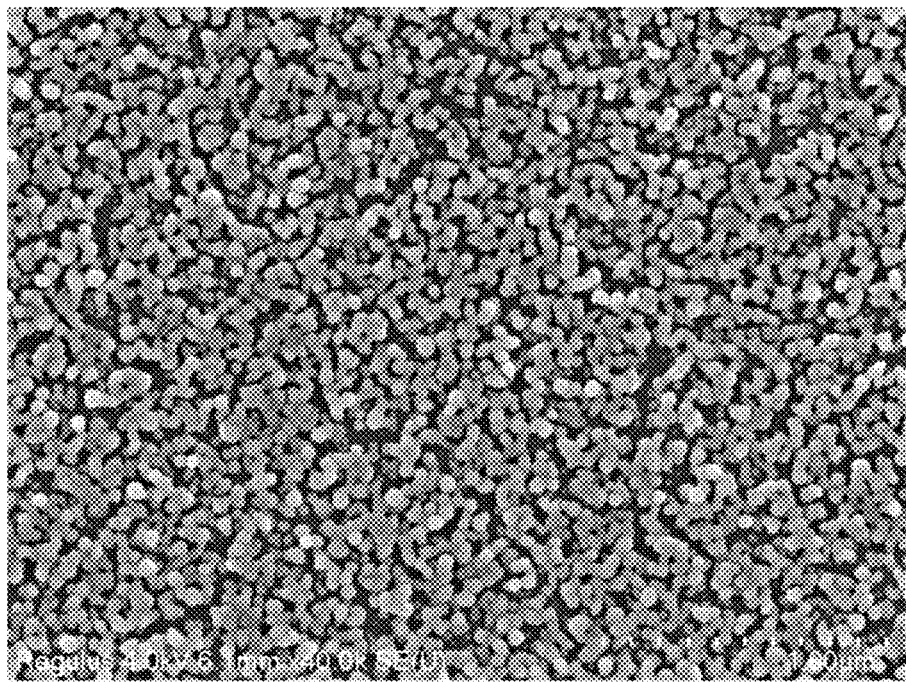
FIG. 5 is a transmission electron microscope photograph of the metal nanoparticle layer of the sensor of FIG. 4.

FIG. 4 is a schematic view showing another example of a sensor according to an embodiment and FIG. 5 is a transmission electron microscope photograph of the metal nanoparticle layer of the sensor of FIG. 4.

Referring to FIG. 4, the sensor 10 according to the present embodiment includes a first metal layer 110 and a second metal layer 120 facing each other, and a volume changeable layer 200 disposed between the first metal layer 110 and the second metal layer 120, as in the aforementioned embodiment.

However, in the sensor 10 according to the present embodiment, unlike the aforementioned embodiment, at least one of the first metal layer 110 and the second metal layer 120 may be a porous semi-transmissive layer. For example, the first metal layer 110 may be a porous semi-transmissive layer.

The porous semi-transmissive layer may include a plurality of metal nanoparticles 110a, and the plurality of metal nanoparticles 110a may form a single layer or several layers. The metal nanoparticles 110a may have an average particle diameter, for example, less than or equal to about 30 nm, and about 1 nm to about 30 nm, about 2 nm to about 20 nm, about 3 nm to about 15 nm, or about 3 nm to about 10 nm. The metal nanoparticles 110a may be formed of, for example, silver (Ag), gold (Au), aluminum (Al), magnesium (Mg), an alloy thereof, or a combination thereof, but are not limited thereto.

The porous semi-transmissive layer including the metal nanoparticles 110a may have a thickness, for example, about 2 nm to about 50 nm, and within the above range, about 5 nm to about 45 nm, about 10 nm to about 40 nm, about 15 nm to about 35 nm, about 20 nm to about 30 nm, or about 25 nm. By including a metal nanoparticle layer as a semi-transmissive layer, moisture or gas molecules may effectively pass through voids between the metal nanoparticles 110a to reach the volume changeable layer 200, so that an absorption rate of moisture or gas molecules in the volume changeable layer 200 may be increased and thus a rate of the aforementioned color change may be increased. Therefore, it is possible to implement a high-speed sensor.

It is important to appropriately control the voids between the metal nanoparticles 110a so that moisture or gas molecules may easily pass through while effectively implementing the aforementioned resonance. For example, it may be implemented by adjusting the length and/or the content of ligands attached to the surface of the metal nanoparticles 110a, etc., when the metal nanoparticles are synthesized, but is not limited thereto.

When the first metal layer 110 is a porous semi-transmissive layer, the second metal layer 120 may be a porous semi-transmissive layer or a reflective layer. The semi-transmissive layer may be a thin metal layer of the aforementioned embodiment or a porous semi-transmissive layer of the present embodiment, and the reflective layer may be a relatively thick metal layer of greater than or equal to about 60 nm including metals, for example, silver (Ag), gold (Au), aluminum (Al), magnesium (Mg), an alloy thereof, or a combination thereof. The reflective layer may have a thickness of about 60 nm to about 500 nm, about 70 nm to about 400 nm, or about 80 nm to about 300 nm. When the second metal layer 120 is a reflective layer, the first metal layer 110, which is a porous semi-transmissive layer, may be a layer through which external light is incident and simultaneously light passing through the sensor 10 escapes.

The volume changeable layer 200 is the same as described above.

The aforementioned sensor 10 may be combined with a photovoltaic cell to form a sensor device. The photovoltaic cell may be configured to convert an optical signal obtained from the sensor 10 into an electrical signal.

Figure 6:
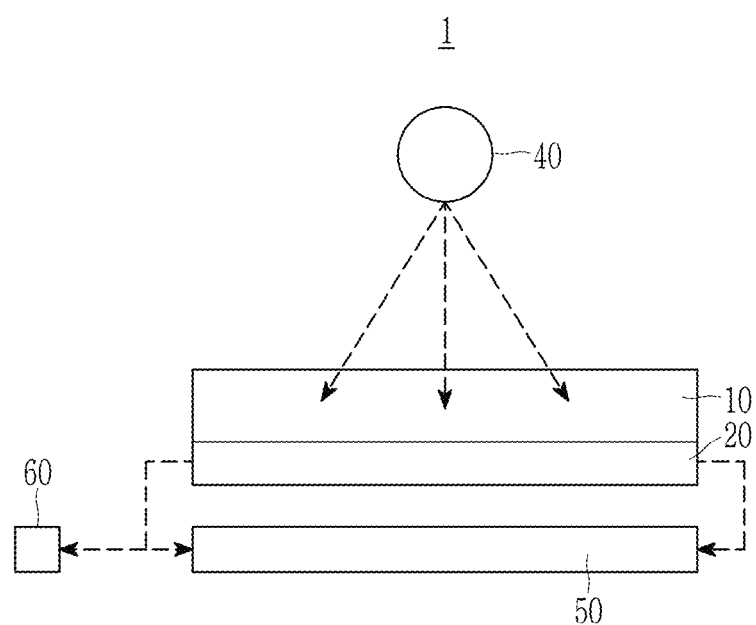
FIG. 6 is a schematic view showing an example of a sensor device according to an embodiment.

FIG. 6 is a schematic view showing an example of a sensor device according to an embodiment.

Referring to FIG. 6, the sensor device 1 according to an embodiment includes the aforementioned sensor 10, a photovoltaic cell 20, a measuring unit 50, and a control unit 60.

As described above, the sensor 10 may indicate a color change by changing a resonance wavelength according to a thickness change due to absorption of a material, and accordingly, may detect a content or physical property of a material.

The photovoltaic cell 20 is disposed on the side through which light passes from the sensor 10, that is, on one surface of the second metal layer 120, and light transmitted through the second metal layer 120 of the sensor 10, that is, light corresponding to a resonance wavelength may be absorbed in the photovoltaic cell 20 and converted into an electrical signal.

Specifically, the photovoltaic cell 20 may include a pair of electrodes (anode and cathode) (not shown) facing each other and a light absorbing layer (not shown) between the pair of electrodes. The light absorbing layer may be configured to absorb light of a predetermined wavelength spectrum, and for example, may be configured to absorb light of at least a portion of a wavelength spectrum of about 400 nm to about 700 nm. When light is absorbed in the light absorbing layer, excitons may be generated, and the generated excitons may be separated into holes and electrons, and the separated holes may move to the anode, one of the pair of electrodes, and the separated electrons may move to the cathode other, the other of the pair of electrodes to obtain an electrical signal. The photovoltaic cell 20 may show a current change according to the amount of the absorbed light, and thus an amount and a property of a material may be confirmed by the current change. For example, the sensor 10 is a humidity sensor and may evaluate a humidity change of the surrounding environment from the current change of the photovoltaic cell 20.

An absorption spectrum of the photovoltaic cell 20 may at least partially overlap with a transmission spectrum of light transmitting the sensor 10. For example, the absorption spectrum of the photovoltaic cell 20 may overlap with the transmission spectrum of light transmitting the sensor 10 in greater than or equal to about 20%, greater than or equal to about 30%, greater than or equal to about 40%, greater than or equal to about 50%, greater than or equal to about 60%, or greater than or equal to about 70%.

The wavelength spectrum in which the absorption rate in the absorption spectrum of the photovoltaic cell 20 is sharply changed may at least partially overlap with the transmission spectrum of light transmitting the sensor 10, for example, the wavelength spectrum in which the variation of the absorption rate in the absorption spectrum of the photovoltaic cell 20 is greater than or equal to about 50%, greater than or equal to about 60%, greater than or equal to about 70%, or greater than or equal to about 80% may at least partially overlap with the transmission spectrum of the sensor 10. In other words, when the photovoltaic cell 20 absorbs light of a transmission spectrum of the sensor 10 which is a wavelength spectrum corresponding to a resonance wavelength of the sensor 10, it is confirmed that the absorption rate of the photovoltaic cell 20 may be sharply changed, thereby the current change may be confirmed. For example, when the wavelength spectrum corresponding to the resonance wavelength of the sensor 10 is about 600 nm to about 700 nm, the absorption rate of the absorption spectrum of the photovoltaic cell 20 may be sharply decreased at least a portion of the wavelength spectrum of about 600 nm to about 700 nm. For example, the variation of the absorption rate may be defined by (difference of absorption rate/absorbed wavelength spectrum)×100, when the photovoltaic cell 20 absorbs light in a wavelength spectrum of less than or equal to about 600 nm, the absorption rate is greater than or equal to about 80%; and when the photovoltaic cell 20 absorbs light in a wavelength region of greater than or equal to about 700 nm, the absorption rate may be less than or equal to about 3%.

An absorption rate of the photovoltaic cell 20 may be changed depending upon a thickness of the sensor 10. For example, as the thickness of the sensor 10 is increased by absorbing a material, the resonance wavelength of the sensor 10 may be shifted into a direction (shifting toward long wavelength spectrum) from about 600 nm to about 700 nm, and as the absorption spectrum of the photovoltaic cell 20 is changed in a sharp slope between about 600 nm and about 700 nm, the absorption rate of the photovoltaic cell 20 may be decreased.

The measuring unit 50 may measure an amount of light absorbed by the photovoltaic cell, and the measured amount of light may be expressed as a current change.

The control unit 60 may calculate an amount or a property of a material based on a current change of the measuring unit 50. For example, when the sensor 10 is a humidity sensor, the control unit 60 may digitize the current change depending upon the amount of light of the measuring unit 50 to a relative humidity (RH).

The sensor device 1 is a self-powered device configured to operate without a separate external power source because power for driving the control unit 60 may be obtained by using the light absorbed by the photovoltaic cell 20 through the sensor 10.

The sensor device 1 may be provided with a light source 40, but may be used in any environment since it can operate as natural light or indoor light without a separate light source. In addition, it may be useful to easily predict and measure the content or physical properties of a material in real time according to the color change of the sensor 10.

The aforementioned sensor 10 or sensor device 1 may detect the content or physical properties of a predetermined material from a color change or an electrical signal obtained from a color change, and for example, may be used effectively as a humidity sensor or a humidity sensor device configured to detect the moisture content in the air. Such a humidity sensor or a humidity sensor device may easily check the humidity of a space such as an enclosed space, office, and storage place in real time.

The aforementioned sensor 10 or sensor device 1 may be applied or included in electronic devices in various fields. For example, the sensor 10 or the sensor device 1 may be applied to a display device.

Figure 7:
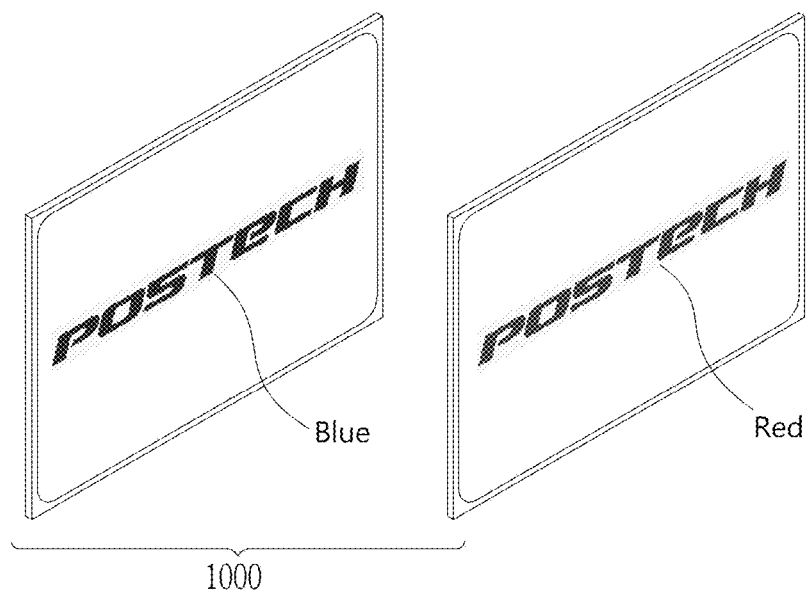
FIG. 7 is a schematic view illustrating an example of a display device according to an embodiment.

FIG. 7 is a schematic view illustrating an example of a display device according to an embodiment.

The display device 1000 according to an embodiment may express a color change of the sensor 10 according to the thickness change as mentioned above or illustrate the information converted to an electrical signal in the sensor device 1 into a letter and/or a diagram. For example, when the sensor 10 is humidity sensor, the display device 1000 may express a color according to humidity of the surrounding environment and illustrate the relative humidity obtained from the measuring unit 50 and the control unit 60 to a number and/or a diagram. In FIG. 7, the color of the letters on the display device may change from blue to red, or vice versa, as the relative humidity is changed.

The display device 1000 may further include a display panel besides the aforementioned sensor device 1, wherein the display panel may be a liquid crystal display panel, an organic light emitting display panel, an inorganic light emitting display panel, or a micro light emitting display panel, and the like, but is not limited thereto. The display panel may be electrically connected to a sensor device 1 and may be disposed at a position closer to a user. For example, the display device 1000 may further include at least one sensor having other function besides the aforementioned sensor device 1 and may simultaneously or sequentially display the various information.

For example, the sensor 10 or the sensor device 1 may be applied to a smart window.

Figure 8:
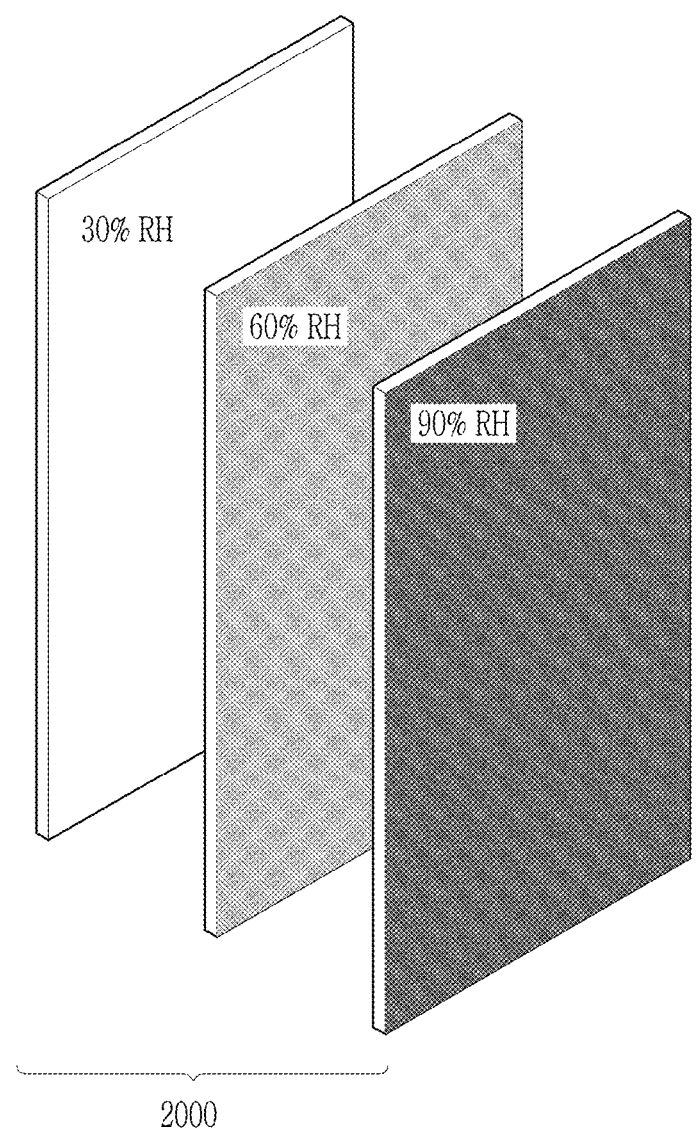
FIG. 8 is a schematic view showing an example of a smart window according to an embodiment.

FIG. 8 is a schematic view showing an example of a smart window according to an embodiment.

The smart window 2000 according to an embodiment may apply the aforementioned sensor device 1. For example, the aforementioned sensor 10 may be a humidity sensor, and the smart window 2000 may easily detect and confirm humidity in a real time from a color change depending upon humidity of the surrounding environment. For example, according to increasing humidity, the thickness of the aforementioned sensor 10 is getting thicker, and a color of a relatively long wavelength spectrum may be displayed; and according to decreasing humidity, the thickness of the aforementioned sensor 10 may be getting thinner, and a color of a relatively short wavelength spectrum may be displayed.

For example, the sensor 10 or the sensor device 1 may be applied to an Internet of Things (IoT) system.

Figure 9:
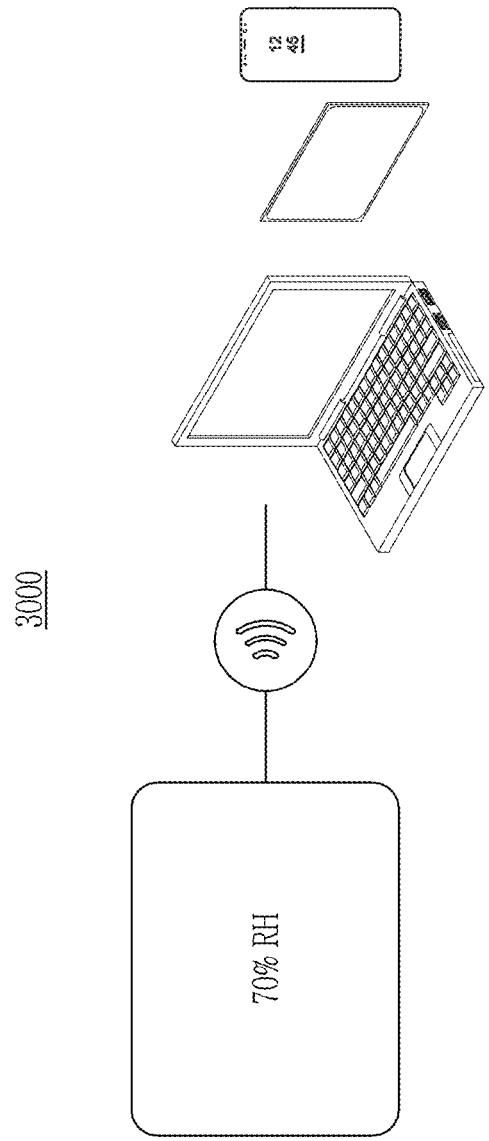
FIG. 9 is a schematic view showing an example of an IoT system according to an embodiment.

FIG. 9 is a schematic view showing an example of an IoT system according to an embodiment.

The IoT system 3000 is a technology that data is sent and received in a real time through an internet by attaching a sensor to a thing, and the information (e.g., humidity) obtained by applying the aforementioned sensor 10 or sensor device 1 may provide a novel functional service by associating the thing to which is tangibly or intangibly connected.

Hereinafter, the embodiments are illustrated in more detail with reference to examples. However, the following examples are for illustrative purposes only and do not limit the scope of the rights.

Optical Simulation Experiment

Example 1

Assuming a sensor having a structure shown in FIG. 1, a color characteristic and a transmission spectrum are calculated by using a Transfer-Matrix Method (TMM).

Substrate: glass substrate
Lower metal layer (semi-transmissive layer): Ag (25 nm)
Volume changeable layer (Volume expansion layer): chitosan hydrogel layer (80 nm~350 nm)
Upper metal layer (semi-transmissive layer): Ag (25 nm)

Figure 10:
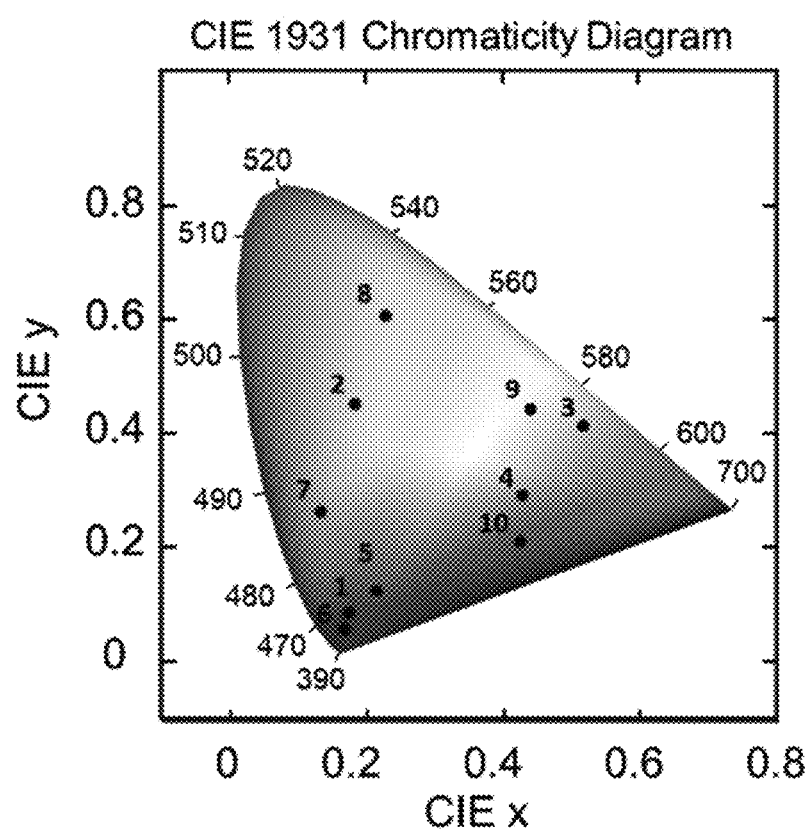
FIG. 10 is a CIE 1931 chromaticity diagram according to the thickness of the volume changeable layer in the sensor according to Example 1.
Figure 11:
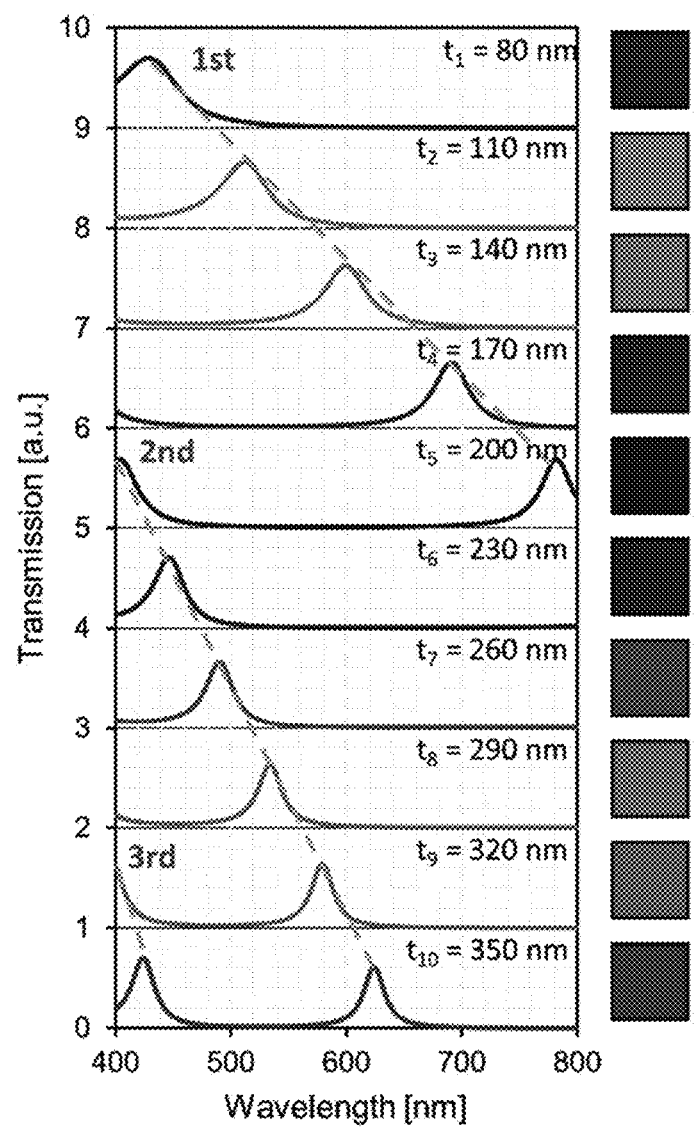
FIG. 11 is a transmission spectrum according to the thickness of the volume changeable layer in the sensor according to Example 1.

The results are shown in FIGS. 10 and 11.

FIG. 10 is a CIE 1931 chromaticity diagram according to the thickness of the volume changeable layer in the sensor according to Example 1 and FIG. 11 is a transmission spectrum according to the thickness of the volume changeable layer in the sensor according to Example 1.

Referring to FIGS. 10 and 11, it is confirmed that the sensor according to Example 1 shows a wide-range color spectrum according to changing a thickness of the volume changeable layer, and as the thickness of the volume changeable layer is getting thicker, a peak of the transmission spectrum is shifted into a long wavelength spectrum. In addition, when the thickness of the volume changeable layer is greater than about 200 nm, the peak present in the UV wavelength spectrum is shifted into the visible wavelength spectrum again to initiate a $2^{nd}$ mode, and the thickness of the volume changeable layer is greater than about 320 nm, the peak present in the UV wavelength spectrum is shifted again into the visible wavelength spectrum to initiate a $3^{rd}$ mode. In this case, it is confirmed that the full width at half maximum (FWHM) of the peak is getting narrower as going to the higher mode, so as to increase a wavelength selectivity.

Based on the results of the optical simulation experiment, the sensor having the structure shown in FIG. 1 is manufactured as follows.

Manufacture of Sensor I

Preparation Example 1: Preparation of Hydrogel Solution 0.6 g of chitosan (Sigma-Aldrich, CAS No. 9012-76-4) and 0.6 ml of acetic acid are added to 40 ml of deionized water to prepare a hydrogel solution. Subsequently, a magnetic bar is put into the hydrogel solution and the hydrogel solution is displaced on an agitator and stand at a temperature of 60° C. to 65° C. for 20 hours, and then centrifuged to separate a supernatant. Then, the separated supernatant is heated at 65° C. for 30 minutes and filtered to prepare a final hydrogel solution.

Example 2

A glass substrate is sequentially cleaned with deionized water, acetone, and isopropanol. Then, silver (Ag) is evaporated on the glass substrate using an electron beam evaporator system (KVE-C30010, Korea Vacuum Tech) under $5 \times 10^{-6}$ Torr to provide a 25 nm-thick lower metal layer (semi-transmissive layer). Subsequently, the hydrogel solution obtained from Preparation Example 1 is spin-coated on the lower metal layer at a speed of 1500 rpm and performed with deprotonation and then dried under an air atmosphere for 19 hours to provide a volume changeable layer. Subsequently, silver (Ag) is evaporated on the volume changeable layer using an electron beam evaporator system (KVE-C30010, Korea Vacuum Tech) under $5 \times 10^{-6}$ Torr to provide a 25 nm-thick upper metal layer (semi-transmissive layer), manufacturing a sensor.

Example 3

A sensor is manufactured in the same manner as in Example 2, except that the hydrogel solution is spin-coated on the lower metal layer at a speed of 2000 rpm.

Example 4

A sensor is manufactured in the same manner as in Example 2, except that the hydrogel solution is spin-coated on the lower metal layer at a speed of 2500 rpm.

Example 5

A sensor is manufactured in the same manner as in Example 2, except that the hydrogel solution is spin-coated on the lower metal layer at a speed of 3000 rpm.

Example 6

A sensor is manufactured in the same manner as in Example 2, except that the hydrogel solution is spin-coated on the lower metal layer at a speed of 3500 rpm.

Example 7

A sensor is manufactured in the same manner as in Example 2, except that the hydrogel solution is spin-coated on the lower metal layer at a speed of 4000 rpm.

Evaluation I

The thicknesses of the volume changeable layers of sensors according to Examples 2 to 7 are measured using an atomic force microscopy (AFM) and compared with a thickness inferred from the color expressed by the sensor. The color expressed by the sensor is evaluated by an optical microscope.

Figure 12:
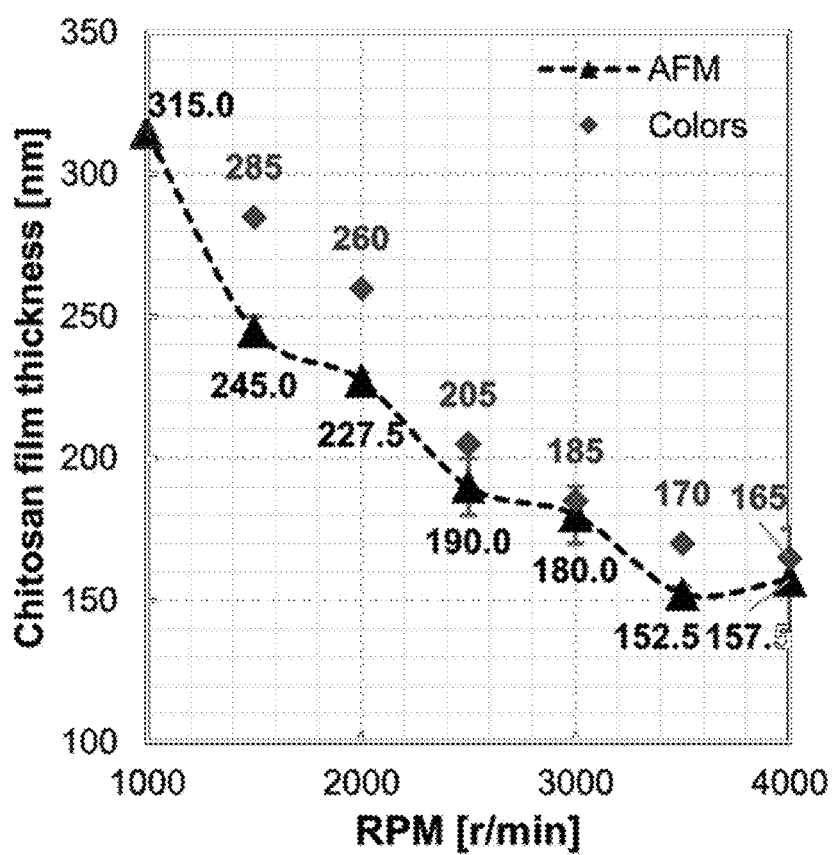
FIG. 12 is a graph showing the thickness of the volume changeable layer of the spin coating of the hydrogel solution in Examples 2 to 7 and the thickness inferred from the colors expressed by the sensors according to Examples 2 to 7.

The results are shown in FIG. 12.

FIG. 12 is a graph showing the thickness of the volume changeable layer of the spin coating of the hydrogel solution in Examples 2 to 7 and the thickness inferred from the colors expressed by the sensors according to Examples 2 to 7.

Referring to FIG. 12, it is confirmed that the thickness of the volume changeable layer is decreased as a speed (RPM) of the spin coating of the hydrogel solution is higher. In FIG. 12, the thickness inferred from the color expressed by the sensor is slightly thicker than the thickness measured by the atomic force microscope (AFM) is estimated. This is why a thickness of a central part of the volume changeable layer is relatively more thickly formed than a thickness of a peripheral part of the volume changeable layer.

Evaluation II

The transmission spectrum according to a thickness of the volume changeable layer in the sensor according to Examples 2 to 7 is evaluated.

Figure 13:
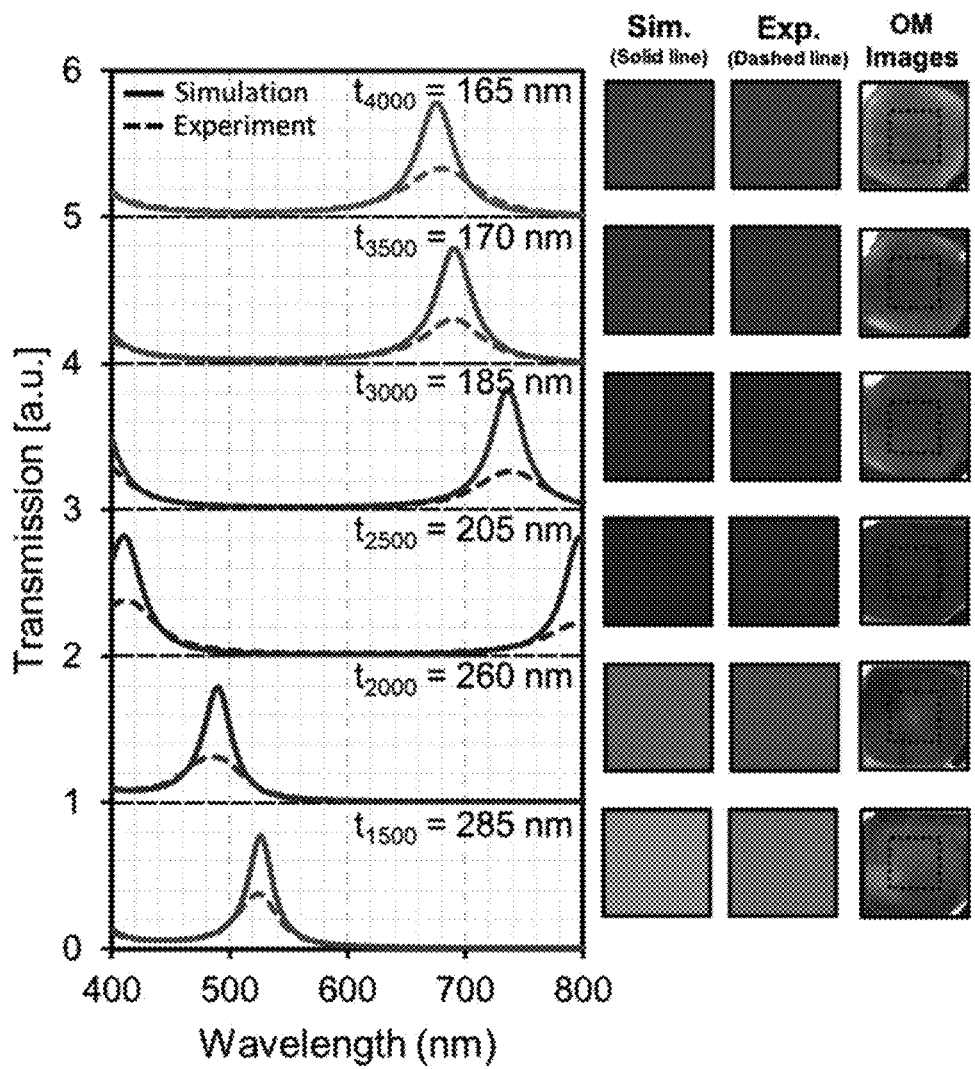
FIG. 13 is a transmission spectrum according to the thickness of the volume changeable layer in the sensor according to Examples 2 to 7.

FIG. 13 is a transmission spectrum according to the thickness of the volume changeable layer in the sensor according to Examples 2 to 7.

FIG. 13 shows a transmission spectrum (solid line) calculated using TMM in the sensor according to Examples 2 to 7 and a transmission spectrum (dotted line) measured using a UV-vis/IR spectrometer, and it is confirmed that the peak of the transmission spectrum of light is shifted according to changing a thickness of the volume changeable layer to display a color change. Specifically, it is confirmed that in the sensor, a peak of the transmission spectrum is shifted into a long wavelength spectrum as the thickness of the volume changeable layer is getting thicker each in a thickness range of about 165 nm to 200 nm ($1^{st}$ mode) and a thickness range of greater than about 200 nm to 285 nm ($2^{nd}$ mode).

Manufacture of Sensor II

Preparation Example 2: Preparation of Silver Nanoparticle Dispersion 0.5 mmol of silver nitrate and 2 mL of oleylamine are added to 50 mL of toluene to prepare a solution. Subsequently, the solution is heated at a temperature of 110° C. for 6 hours under a nitrogen atmosphere. Ethanol is added to the heated solution and centrifuged to separate a pellet, and the pellet is dispersed in octane to provide 7 wt % of Ag nanoparticle dispersion.

Example 8

A glass substrate is sequentially cleaned with deionized water, acetone, and isopropanol. Then, Ag is evaporated on the glass substrate using an electron beam evaporator system (KVE-C30010, Korea Vacuum Tech) under 5×10$^{-6}$ Torr to provide a 100 nm-thick lower metal layer (reflective layer). Subsequently, the hydrogel solution obtained from Preparation Example 1 is spin-coated on the lower metal layer, and treated with deprotonation and then dried it under the air atmosphere for 19 hours to provide a 145 nm-thick volume changeable layer (@ relative humidity 20%). Subsequently, the Ag nanoparticle dispersion obtained from Preparation Example 2 is spin-coated on the volume changeable layer, and the sample is immersed in a 1% ammonium thiocyanate acetone solution for 1 minute to provide a 50 nm-thick upper metal layer (semi-transmissive layer), manufacturing a sensor.

Manufacture of Sensor Device I

Example 9

Figure 14:
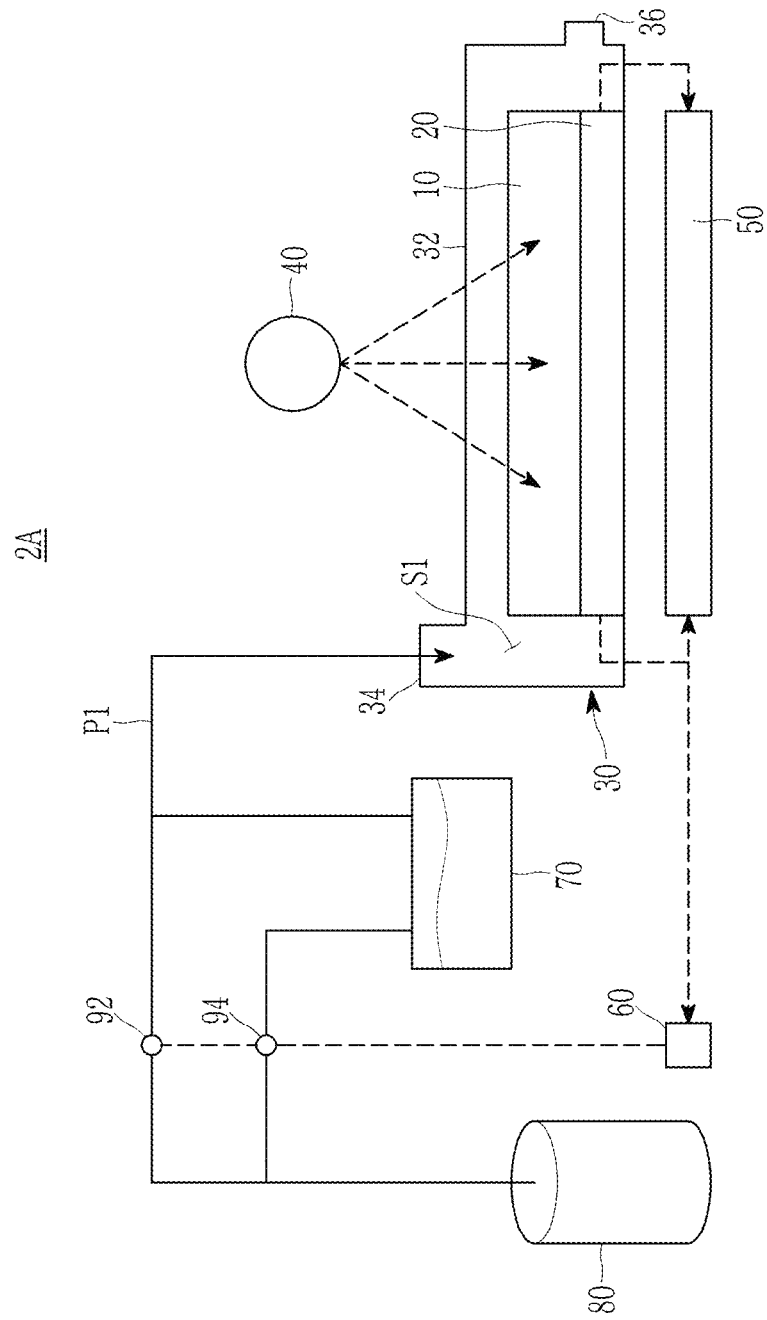
FIG. 14 is a schematic view of a humidity measurement simulation device used in Example 9.

The simulation device for measuring humidity 2A shown in FIG. 14 is installed. Specifically, the simulation device for measuring humidity 2A includes a chamber 30 including a transparent window 32 configured to transmit light coming out from a light source 40, an inlet 34 configured to inflow moisture, and an outlet 36 configured to discharge moisture; a moisture storage unit 70 for storing moisture flowing into the chamber 30; a nitrogen storage unit 80 for storing nitrogen mixed with moisture stored in the moisture storage unit 70; and a control unit 60 for controlling an amount of moisture flowing into a housing 30.

Figure 15:
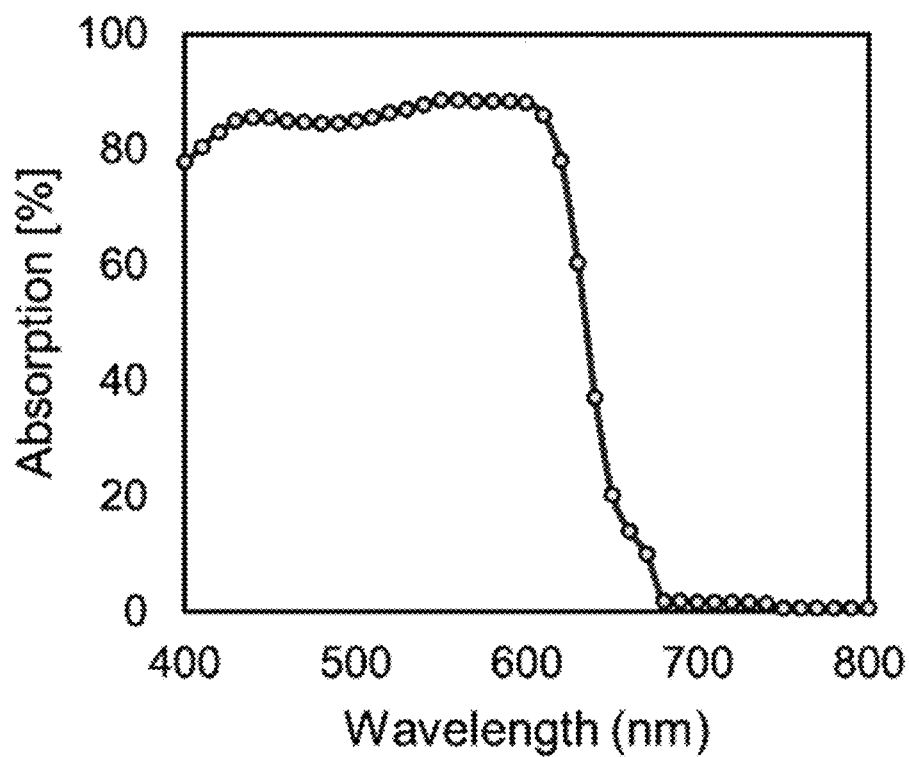
FIG. 15 is an absorption spectrum of a photovoltaic cell included in the simulation device for measuring humidity used in Example 9.

The sensor 10 is fabricated in a structure of Ag semi-transmissive layer (25 nm)/chitosan volume changeable layer (145 nm) (resonance wavelength: 650 nm)/Ag semi-transmissive layer (25 nm). The sensor 10 is stacked with a photovoltaic cell (light absorbing layer: poly-3-hexylthiophene, P3HT PV cell) 20 and closely sealed in a chamber 30 and installed. The photovoltaic cell 20 shows light absorption characteristics at wavelength spectrum of about 400 nm to about 700 nm as shown in FIG. 15, and shows an absorption rate of greater than or equal to about 80% in a wavelength spectrum of about 400 nm to 600 nm, wherein the light absorption characteristics are sharply changed in a wavelength spectrum of about 600 nm to 700 nm.

The measuring unit 50 is connected to the photovoltaic cell 20 and may measure an absorption amount of light absorbed by the photovoltaic cell 20, and the control unit 60 may convert the absorption amount of light measured by the measuring unit 50 to humidity. Display unit (not shown) may display humidity calculated by the control unit 60 as a letter and/or a diagram.

The moisture storage unit 70 is connected to a nitrogen storage unit 80 by a pipe or a line. The control unit 60 may control valves 92 and 94 provided between the moisture storage unit 70 and the nitrogen storage unit 80 and may control an amount of moisture reaching to the housing 30 by controlling the valves 92 and 94. The control unit 60 may control an amount of moisture stored in the moisture storage unit 70 and an amount of nitrogen stored in the nitrogen storage unit 80 or a ratio of moisture and nitrogen to flow into the housing 30.

Evaluation III

While the simulation device for measuring humidity 2A according to Example 9 is supplied with moisture, thickness and color changes of the volume changeable layer of the sensor according to changing a relative humidity are evaluated.

Figure 16:
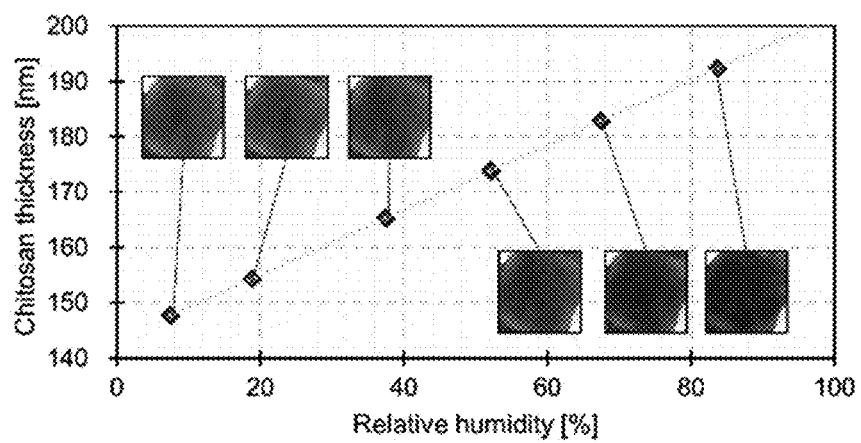
FIG. 16 is a graph showing the thickness changes of the volume changeable layer according to the relative humidity and the color transmitted through the sensor in the simulation device for measuring humidity according to Example 9.
Figure 17:
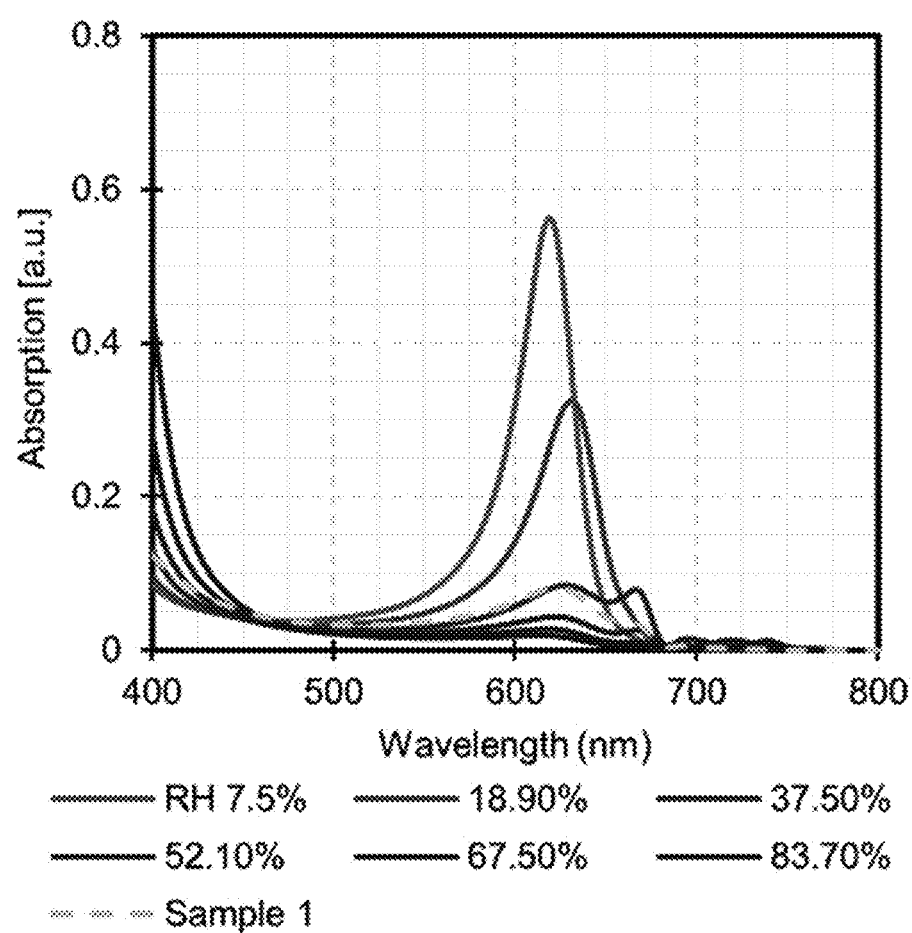
FIG. 17 is a graph showing the absorption rate of a photovoltaic cell in a simulation device for measuring humidity according to Example 9.
Figure 18:
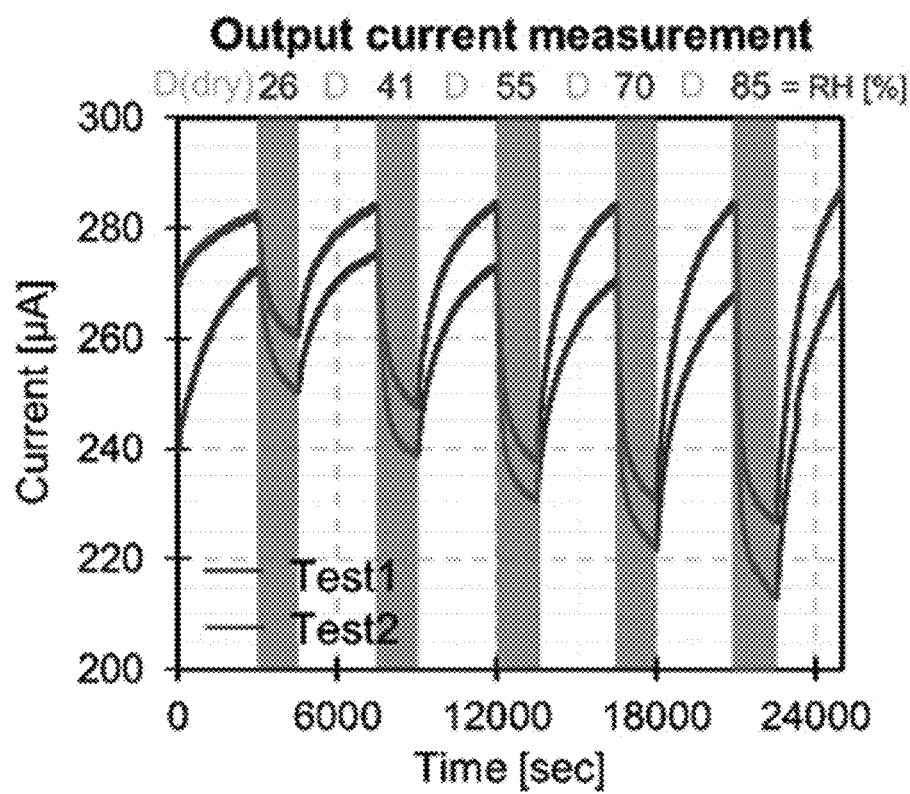
FIG. 18 is a graph showing current changes over time of a photovoltaic cell in the simulation device for measuring humidity according to Example 9.
Figure 19:
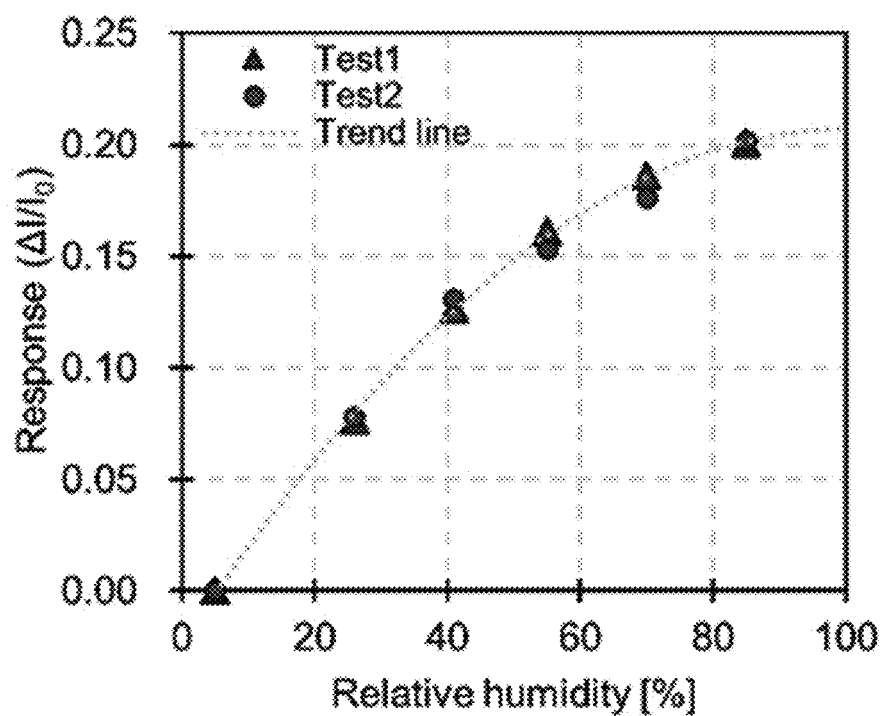
FIG. 19 is a graph showing the correlation between the response measured by the sensor device and the relative humidity in the simulation device for measuring humidity according to Example 9.

FIG. 16 is a graph showing the thickness changes of the volume changeable layer according to the relative humidity and the color displayed through the sensor in the simulation device for measuring humidity 2A according to Example 9, FIG. 17 is a graph showing the absorption rate of a photovoltaic cell in the simulation device for measuring humidity 2A according to Example 9, FIG. 18 is a graph showing current changes over time of a photovoltaic cell in the simulation device for measuring humidity 2A according to Example 9, and FIG. 19 is a graph showing the correlation between the response measured by the sensor device and the relative humidity in the simulation device for measuring humidity 2A according to Example 9.

Referring to FIG. 16, as the relative humidity increases, the thickness of the volume changeable layer linearly increases and a color change appears.

Referring to FIG. 17, it is confirmed that the absorption rate of the photovoltaic cell 20 is changed depending upon a relative humidity, and when the relative humidity is changed from 7.5% to 83.70%, the absorption rate of the photovoltaic cell 20 is decreased. The change of the absorption rate of the photovoltaic cell 20 may have direct influences on an output current.

Referring to FIG. 18, it is confirmed that current of the photovoltaic cell 20 measured by the measuring unit 50 is decreased according to increasing the relative humidity of the chamber 30 in a sensing region (moisture supply region, grey), and it is confirmed the current is recovered again in a recovery region (moisture exhaust region, white). Thereby, it is confirmed that a thickness of the volume changeable layer is changed according to a relative humidity.

Referring to FIG. 19, the relative humidity may be measured through a predetermined algorithm based on a current of the photovoltaic cell 20 measured by the measuring unit 50, and a response for quantifying the relative humidity may be defined by $\Delta I/I_0$, wherein $\Delta I$ is a current change of the photovoltaic cell 20 measured by the measuring unit 50 before and after the moisture supply, and $I_0$ is an initial current at the drying state (relative humidity of about 5%). The relationship between this response and the relative humidity may be represented by Relational Equation 1.

$$S=-0.00002 \times h^2 + 0.0046 \times h - 0.0238 \quad \text{[Relational Equation 1]}$$

In Relational Equation 1, S is a response and h is relative humidity.

Thereby, the response may be obtained from the current change of the photovoltaic cell 20 of the sensor device 1, thereby a relative humidity may be obtained. In addition, the color transmitting the sensor 10 is changed according to the moisture change, so that the humidity change in real time may be confirmed.

Manufacture of Sensor Device II

Example 10

Figure 20:
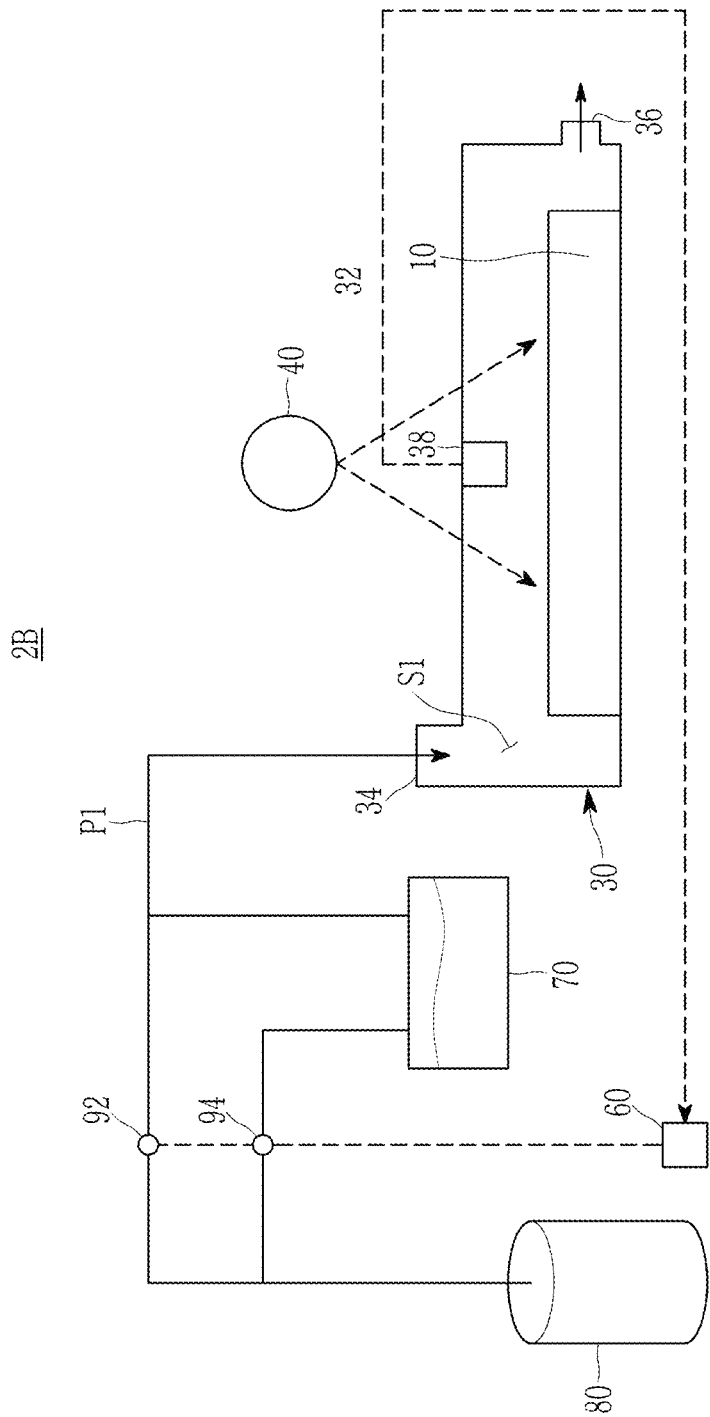
FIG. 20 is a schematic view of the simulation device for measuring humidity used in Example 10.

A simulation device for measuring humidity 2B shown in FIG. 20 is installed. The simulation device for measuring humidity 2B shown in FIG. 20, unlike the simulation device for measuring humidity 2A shown in FIG. 14, includes a sensor according to Example 8 as the sensor 10 and a ultraviolet (UV)-visible spectrometer (UV-Vis spectrometer) 38 instead of the photovoltaic cell 20. The UV-Vis spectrometer 38 may measure a reflectance of light coming out from the sensor 10.

Evaluation IV

While the simulation device for measuring humidity 2B according to Example 10 is supplied with moisture, a color change and a reaction speed of the sensor depending upon changing a relative humidity are evaluated.

The reaction speed is evaluated by a time reaching an equilibrium after supplying moisture while measuring a real time Peak Intensity at a wavelength of 550 nm (resonance wavelength).

Figure 21:
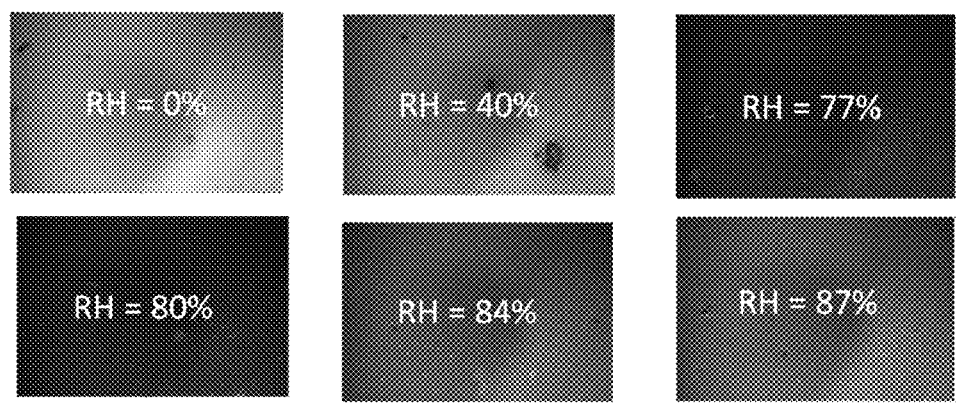
FIG. 21 is a photograph showing the color reflected from the sensor according to the relative humidity in the simulation device for measuring humidity used in Example 10.
Figure 22:
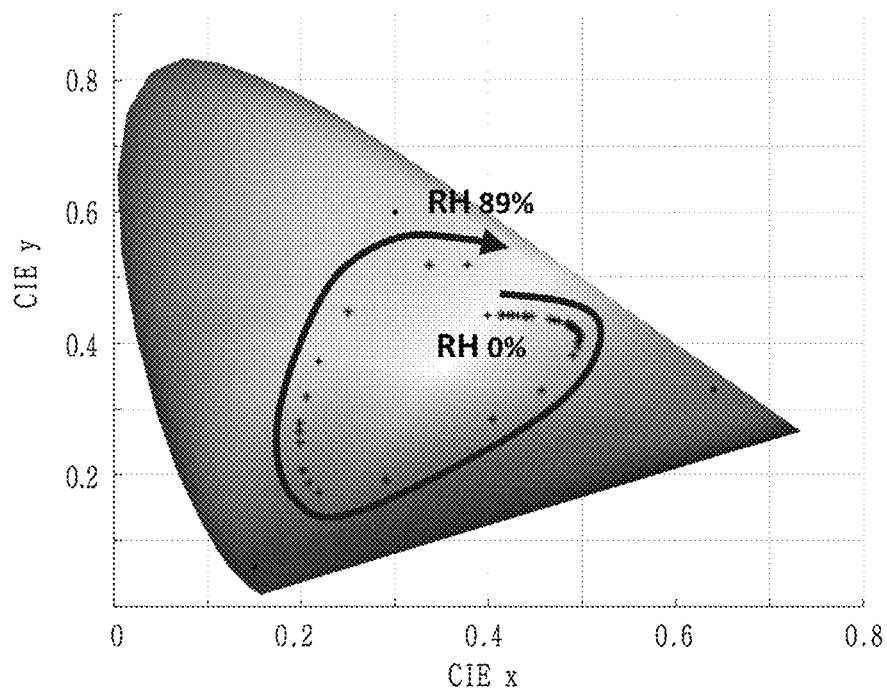
FIG. 22 is a CIE 1931 chromaticity diagram of colors expressed by a sensor according to the relative humidity in the simulation device for measuring humidity used in Example 10.
Figure 23:
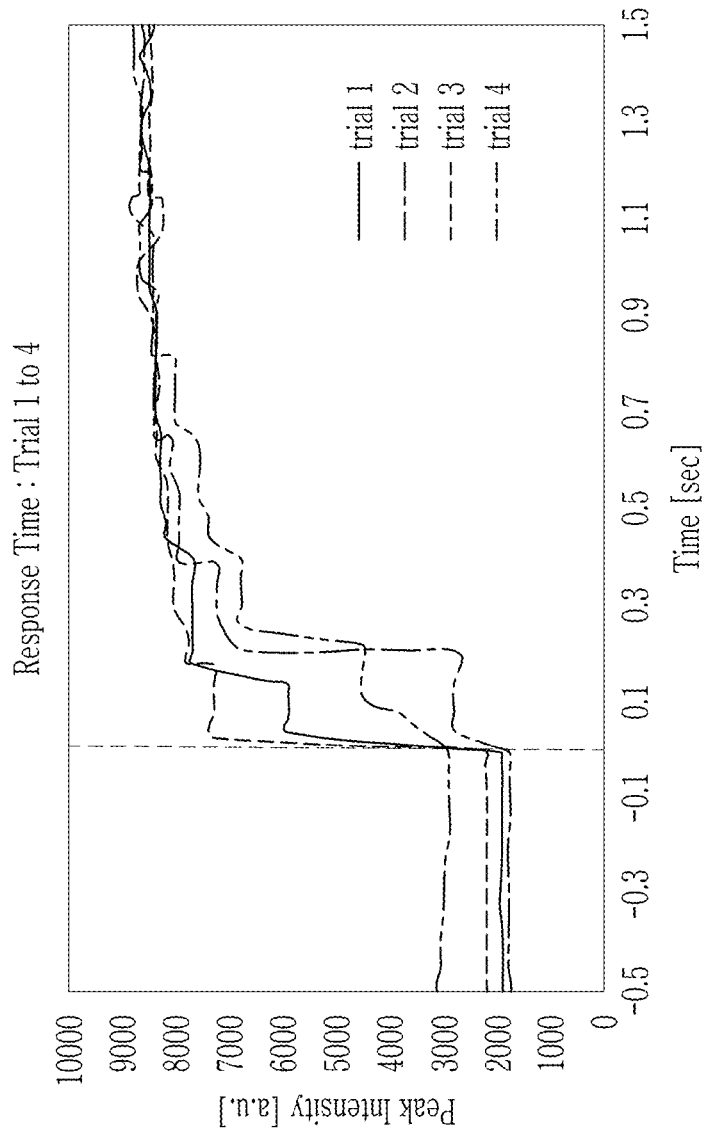
FIG. 23 is a graph showing the detecting speed of a sensor in the simulation device for measuring humidity used in Example 10.

FIG. 21 is a photograph showing the color reflected from the sensor according to the relative humidity in the simulation device for measuring humidity 2B according to Example 10, FIG. 22 is a CIE 1931 chromaticity diagram of colors expressed by a sensor according to relative humidity in the simulation device for measuring humidity 2B according to Example 10, and FIG. 23 is a graph showing the detecting speed of a sensor in the simulation device for measuring humidity 2B according to Example 10.

Referring to FIGS. 21, 22, it is confirmed that a sensor may express a color spectrum in a wide range depending upon changing a relative humidity. Referring to FIG. 23, it is confirmed that it may reach equilibrium in a very fast time (within about 0.5 seconds) according to supplying moisture.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A sensor, comprising
   a first metal layer and a second metal layer, the first metal layer and the second metal layer facing each other, and
   a volume changeable layer disposed between the first metal layer and the second metal layer, the volume changeable layer being configured to absorb a material to change the thickness thereof,
   wherein the first metal layer and the second metal layer are a first semi-transmissive metal layer and a second semi-transmissive metal layer, respectively, the first semi-transmissive metal layer and the second semi-transmissive metal layer each having a thickness of about 2 nm to about 50 nm,
   the first semi-transmissive metal layer is a light incident layer into which external light including a visible wavelength spectrum is incident,
   the second semi-transmissive metal layer configured to transmit light of a resonance wavelength enhanced by repetitive reflection between the first semi-transmissive metal layer and the second semi-transmissive metal layer, and
   the sensor indicates a color change by changing a resonance wavelength of light transmitted through the second semi-transmissive metal layer according to a change in thickness of the volume changeable layer.

2. The sensor of claim 1, wherein
   inner surfaces of the first semi-transmissive metal layer and the second semi-transmissive metal layer facing each other have a mirror surface configured to reflect at least a portion of light of a visible wavelength spectrum.

3. The sensor of claim 1, wherein the volume changeable layer is configured to expand by absorption of the material and contract by discharge or loss of the material.

4. The sensor of claim 1, wherein the material comprises moisture.

5. The sensor of claim 1, wherein the thickness of the volume changeable layer changes in the range of about 50 nm to about 800 nm.

6. The sensor of claim 1, wherein the volume changeable layer comprises an insulating polymer with three-dimensional structure.

7. The sensor of claim 6, wherein the insulating polymer comprises hydrogel.

8. The sensor of claim 1, wherein
   the volume changeable layer comprises a moisture absorbing polymer, and
   the sensor is a humidity sensor.

9. The sensor device, comprising
the sensor of claim 1, and
a photovoltaic cell configured to convert light transmitted through the sensor into an electrical signal.

10. The sensor device of claim 9, wherein the photovoltaic cell comprises a light absorbing layer configured to absorb light of at least a portion of a wavelength spectrum of about 400 nm to about 700 nm.

11. The sensor device of claim 10, wherein the absorption spectrum of the light absorbing layer of the photovoltaic cell at least partially overlaps with a transmission spectrum of light of the resonance wavelength transmitted through the second semi-transmissive metal layer of the sensor, such that the photovoltaic cell is configured to absorb light of the resonance wavelength transmitted through the sensor and convert the absorbed into an electrical signal.

12. The sensor device of claim 11, wherein a wavelength region in which an absorption rate change is greater than or equal to about 50% among the absorption spectrum of the photovoltaic cell at least partially overlaps with the transmission spectrum of the sensor.

13. The sensor device of claim 9, wherein as the thickness of the volume changeable layer increases, the absorption rate of the photovoltaic cell decreases.

14. The sensor device of claim 9, further comprising
a measuring unit configured to measure an amount of light absorbed by the photovoltaic cell, and
a control unit configured to quantify the amount of light measured by the measuring unit.

15. The sensor device of claim 14, wherein
the sensor is a humidity sensor, and
the control unit is configured to quantify the amount of light as a relative humidity.

16. The sensor device of claim 9, wherein the sensor device is a self-powered device configured to obtain power from light transmitted through the sensor.

17. The sensor of claim 1, wherein the peak wavelength of the transmission spectrum of light transmitted through the second semi-transmissive metal layer belongs to a visible wavelength spectrum.

18. The sensor of claim 17, wherein as the volume changeable layer expands, the peak wavelength of the transmission spectrum of the light transmitted through the second semi-transmissive metal layer is shifted into a direction of a longer wavelength.

19. An electronic device comprising the sensor device of claim 9.

20. A smart window comprising the sensor device of claim 9.

21. An IoT system comprising the sensor device of claim 9.

* * * * *